US012743543B2

(12) United States Patent
Kairali et al.

(10) Patent No.: US 12,743,543 B2
(45) Date of Patent: Sep. 22, 2026

(54) DATA LAKEHOUSE ENCRYPTION

(71) Applicant: International Business Machines Corporation, Armonk, NY (US)

(72) Inventors: Sudheesh S. Kairali, Kozhikode (IN); Binoy Thomas, Kozhikode (IN); Sarbajit Kumar Rakshit, Kolkata (IN); Vijay Kalangumvathakkal, Pathanamthitta (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 29 days.

(21) Appl. No.: 19/008,773

(22) Filed: Jan. 3, 2025

(65) Prior Publication Data

US 2026/0195475 A1 Jul. 9, 2026

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01)

(58) Field of Classification Search
CPC ........................... G06F 21/602; G06F 21/6227
See application file for complete search history.

(56) References Cited

U.S. PATENT DOCUMENTS 10,528,557 B1 1/2020 Chmil et al.
11,567,936 B1 * 1/2023 Jindal ............... G06F 16/24542
12,019,631 B1 6/2024 Chaubey et al.
2016/0330180 A1 * 11/2016 Egorov .................... G09C 1/00
2018/0351921 A1 * 12/2018 Sharifi Mehr ........ H04L 63/205
2019/0361888 A1 * 11/2019 Das ......................... G06F 16/22
2022/0292092 A1 * 9/2022 Brown ................ G06F 16/2246

OTHER PUBLICATIONS

Pradeep Rao Vennamaneni, Delta Lake Optimization Techniques for Scalable Lakehouse, International Journal of Sustainability and Innovation in Engineering (IJSIE) (Oct. 19, 2024) (Year: 2024).*

Antony et al., "Multidimensional Bucketization for Frequent Queries over Encrypted Data", IJIRCCE, https://ijircce.com/admin/main/storage/app/pdf/FpUZ5azU3w0cM7CKuwMRYTTAtDzC8v4Mwa514Qfc.pdf, Nov. 2015, 6 pages.

(Continued)

*Primary Examiner* — Theodore C Parsons
(74) *Attorney, Agent, or Firm* — Cantor Colburn LLP; Stephen Yoder

(57) ABSTRACT

Examples described herein provide a computer-implemented method for data lakehouse encryption that includes receiving a query for data stored in a data lakehouse. The method further includes determining whether the query is a frequent query by comparing a frequency of the query to a threshold. The method further includes, responsive to determining that the query is a frequent query, storing envelope encrypted data and a query index in a frequent data access database, the envelope encrypted data being data that relates to the query. The method further includes, responsive to receiving the query at a later time, returning, to a user, the envelope encrypted data from the frequent data access database without decrypting other data stored in the data lakehouse.

16 Claims, 6 Drawing Sheets

(56) References Cited

OTHER PUBLICATIONS

Authors et. al., Disclosed Without Attribution, Intelligent Log Management in Data Lakehouses, IPCOM000274422D, May 17, 2024, 5 pages.
Dorneanu et al., "Build secure encrypted data lakes with AWS Lake Formation", https://aws.amazon.com/blogs/big-data/build-secure-encrypted-data-lakes-with-aws-lake-formation/, Jun. 4, 2021, 17 pages.
IBM, "Data lake solutions", retrieved from web https://www.ibm.com/data-lake, dated Feb. 27, 2025, 5 pages.
IBM, "What is a data lake?", retrieved from web https://www.ibm.com/think/topics/data-lake, Jan. 16, 2025, 5 pages.
L'Esteve, "Advanced Databricks Lakehouse Capabilities", Azure Databricks, https://www.mssqltips.com/sqlservertip/7244/advanced-databricks-lakehouse-encryption-security-query-plans-cdc/, May 10, 2022, 11 pages.
Lukichev, "Enhancing Query Efficiency in Lakehouses", Telmai, Apr. 16, 2024, 5 pages.
Mellor et al., "Dell enhances data lakehouse with faster query speeds and more", Blocks&Files, https://blocksandfiles.com/2024/07/24/queries-data-lakehouse-upgrade/, Jul. 24, 2024, 4 pages.
Tang et al., "Separation Is for Better Reunion: Data Lake Storage at Huawei", 2024 IEEE 40th International Conference on Data Engineering (ICDE), https://ieeexplore.ieee.org/document/10598130, Jul. 23, 2024, 14 pages.

* cited by examiner

DATA LAKEHOUSE ENCRYPTION

BACKGROUND

The present disclosure relates to computing environments, and more specifically, to data lakehouse encryption.

Data lakes, data warehouses, and data lakehouses are data storage architectures designed for storing data in different ways. Data lakes store vast amounts of raw, unstructured, semi-structured, and structured data in its native format, making them ideal for big data analytics and machine learning. Data warehouses, on the other hand, are optimized for storing structured, processed data in predefined schemas, enabling fast queries and business intelligence. Data lakehouses combine the strengths of data lakes and data warehouses, offering the flexibility and scalability of a data lake with the structured performance and analytical capabilities of a data warehouse, all in a unified platform.

Data lakes and data lakehouses provide a centralized repository for managing large data volumes. They serve as a foundation for collecting and analyzing structured, semi-structured and unstructured data in its native format for long-term storage and to drive insights and predictions. Unlike traditional data warehouses, data lakes and data lakehouses can process video, audio, logs, texts, social media, sensor data, and documents to power apps, analytics, and artificial intelligence. Data lakes and data lakehouses can also be built as part of a data fabric architecture to provide the right data, at the right time, regardless of where it is resides.

SUMMARY

According to an embodiment, a computer-implemented method for data lakehouse encryption is provided. The method includes receiving a query for data stored in a data lakehouse. The method further includes determining whether the query is a frequent query by comparing a frequency of the query to a threshold. The method further includes, responsive to determining that the query is a frequent query, storing envelope encrypted data and a query index in a frequent data access database, the envelope encrypted data being data that relates to the query. The method further includes, responsive to receiving the query at a later time, returning, to a user, the envelope encrypted data from the frequent data access database without decrypting other data stored in the data lakehouse.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

DETAILED DESCRIPTION

Figure 1:
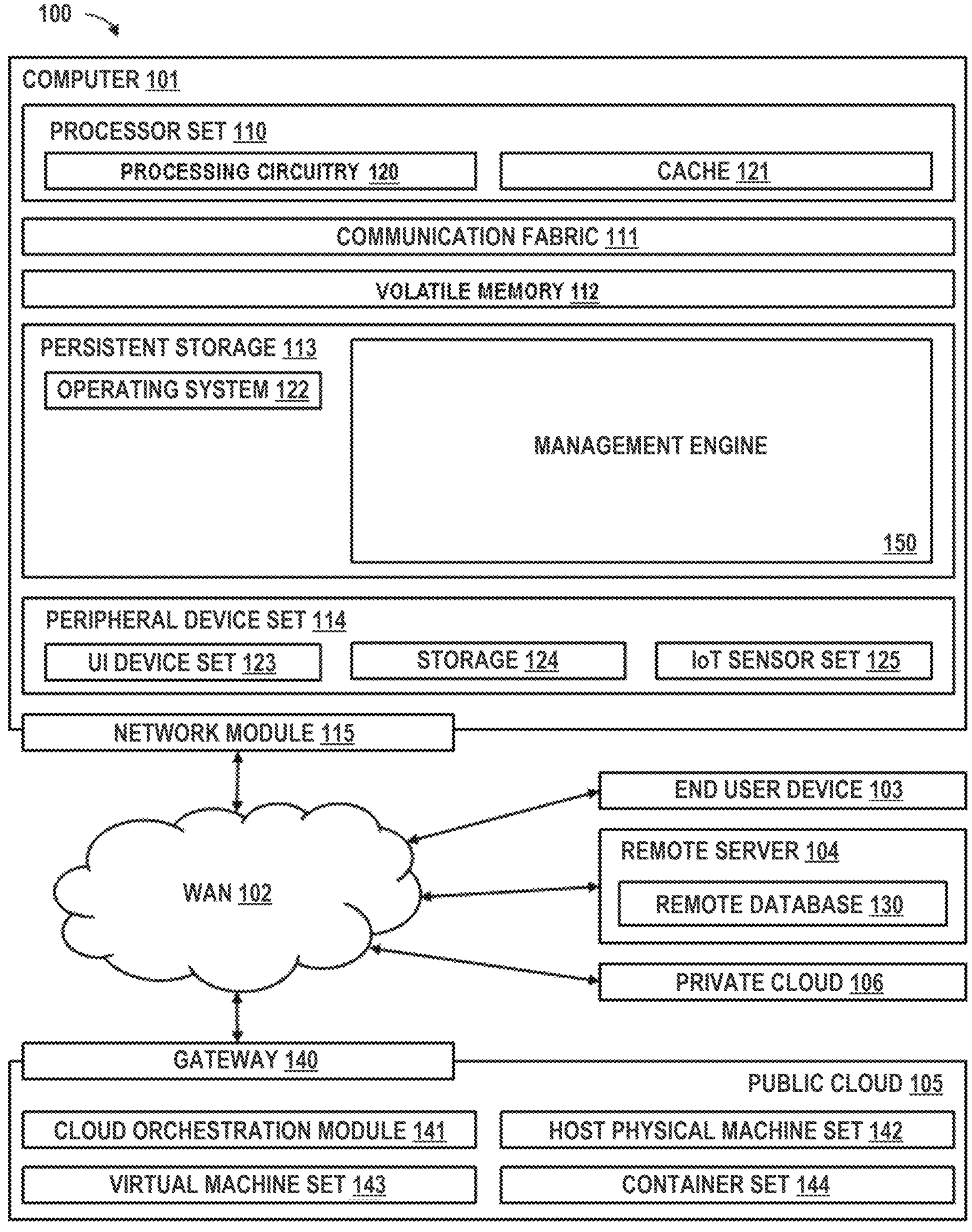
FIG. 1 illustrates a block diagram of a computing environment according to an embodiment of the present disclosure.

One or more embodiments described herein provides data lakehouse encryption.

In modern computing environments, managing large amounts of data efficiently and securely remains a significant challenge. A data lakehouse is an extension of a data lake and a data warehouse. Particularly, a data lakehouse merges aspects of a data lake and a data warehouse to realize advantages from both data storage and management stack. Data lakehouse enable movement of data in a system without needing to access multiple systems. Data lakehouses also ensure that teams have complete and up-to-date data for performing various tasks, such as data science, machine learning, and business analytics projects. Data lakehouses have three enabling technology layers including metadata layers for data lakes, data integration tools (e.g., extract, load, and transform ("ELT") or extract, transform, and load ("ETL")), and data access tools (e.g., data science, machine learning, etc.). After data cleansing, the data can be stored in multiples storage databases, such as relational database management system (RDBMS), not only SQL (NoSQL), etc.

Currently, data lakehouse infrastructure ecosystems support multiple encryptions for data security. Mainly, data lakehouse and data warehouse implementations support disk-level encryption and database-level encryption. Typically, disk-level encryption and encryption methods are provided by cloud or data lakehouse providers. A customer then uses envelope encryption by bringing the customer's encryption methods to encrypt respective database documents, such as tables for RDBMS or collections for NoSQL. In this scenario, whenever a query is executed, entire tables or collections need to be decrypted to perform the search. Querying encrypted data in databases is costly in terms of cryptography and computational resources, leading to inefficiencies and increased computational overhead.

One or more embodiments described herein addresses these challenges by providing intelligent data lakehouse encryption techniques that optimizes the process of querying encrypted data. One or more embodiments identifies frequently used queries and limits the documents that need to be decrypted for a particular search. In data lakehouse scenarios, queries are often made from automated or system components on a regular basis, making many queries periodic. By analyzing each query in a cleansed data store, one or more embodiments can identify frequent queries from one or more users. If repeated queries are detected that meet a predefined threshold, one or more embodiments stores the encrypted data and query index in a frequent data access database. This approach allows the storage system to return results from stored indexes without needing to decrypt the entire database for similar consecutive queries, thereby improving efficiency and reducing cryptographic costs (e.g., reducing computational overhead and use of computational resources).

Descriptions of various embodiments of the present disclosure are presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, and/or to enable others of ordinary skill in the art to understand the embodiments disclosed herein.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100 according to an embodiment of the present disclosure. Computing environment 100 contains an example of an environment for the execution of at least some of the computer code involved in performing the inventive methods, such as an encryption engine 150 for identity provider agnostic departmental multi-tenancy management of storage resources. In addition to the encryption engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the encryption engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the encryption engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the encryption engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The encryption engine 150 provides lakehouse data encryption. Further features of the encryption engine 150 are now described in more detail with references to FIGS. 2 and 3 but are not so limited.

Figure 2A:
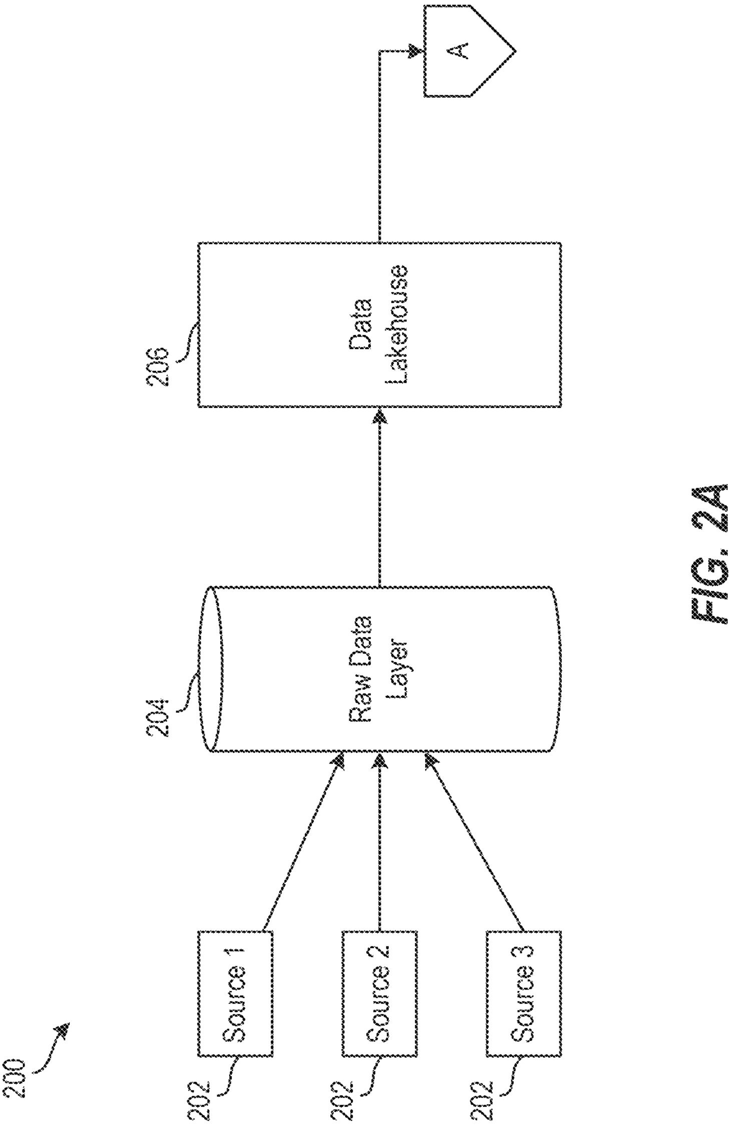
FIGS. 2A and 2B together illustrates a block diagram of system for providing data lakehouse encryption according to an embodiment of the present disclosure.
Figure 2B:
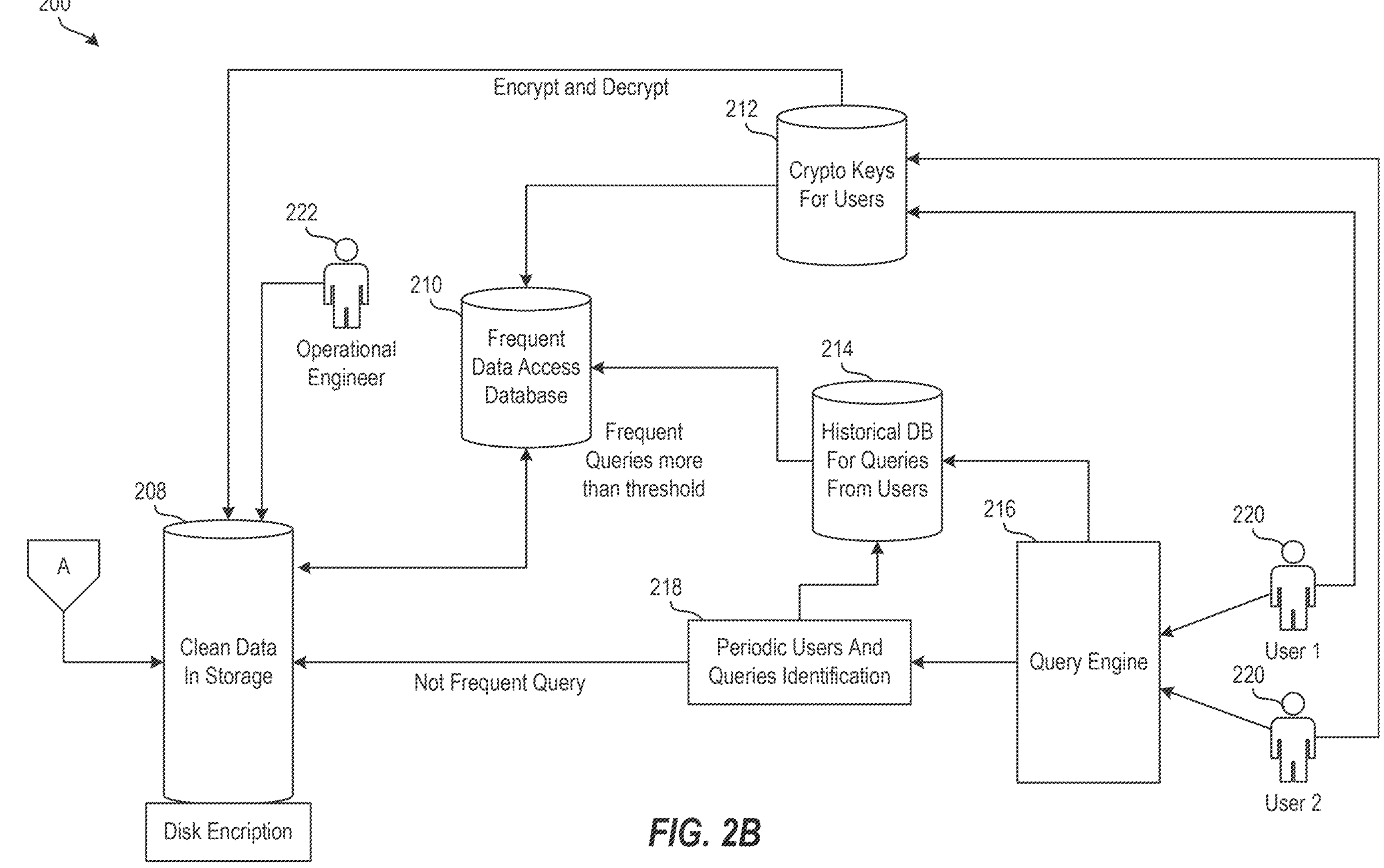

FIGS. 2A and 2B together illustrates a block diagram of system for providing data lakehouse encryption according to an embodiment of the present disclosure.

FIG. 2A shows the initial stages of data processing, where data from multiple sources 202 (e.g., Source 1, Source 2, and Source 3) is ingested into a raw data layer 204. This raw data is then transferred to the data lakehouse 206 for further processing and storage. The data lakehouse 206 serves as a centralized repository for managing large volumes of data, such as the data received from the sources 202.

FIG. 2B provides a detailed view of the components involved in the encryption and query optimization process within the data lakehouse for providing lakehouse data encryption for the data lakehouse 206. Clean data in storage 208 represents the cleansed and processed data stored in the data lakehouse 206, which is protected by disk encryption. The system 200 includes a frequent data access database 210, which stores frequently accessed data and query indexes. This database is managed using crypto keys for users 212 to ensure data security through envelope encryption.

The historical database for queries from users 214 maintains a record of past queries from users (e.g., users 220). The query engine 216 receives queries from the users 220 (e.g., User 1, User 2). Periodic users and queries identification 218 identifies frequent queries and routes these to historical database for queries from users 214. According to one or more embodiments, the periodic users and queries identification 218 utilizes heuristic analysis and/or artificial intelligence to identify periodic/frequent queries from one or more of the users 220. Non-frequent queries are routed to clean data in storage 208. For example, if a query is identified as frequent in that it satisfies a predefined threshold, the system 200 stores the encrypted data and query index associated with the query in the frequent data access database 210. For non-frequent queries, the system 200 retrieves data from the clean data in storage 208.

An operational engineer 222 oversees the operations of the system 200, ensuring that updates or edits to the data collections are reflected in the frequent data access database 210.

As additional queries are received and/or as data is modified, the system 200 can implement an update process. This update process involves encrypting and decrypting data as necessary using the crypto keys for users 212. The intelligent data management capabilities of the system 200 allow the system 200 to optimize storage space by adding frequently accessed data to the frequent data access database 210 while maintain less frequently accessed data in the clean data in storage 208, such as if access to that data is below a threshold. Overall, the system 200 enhances the efficiency, performance, and security of data lakehouse environments by optimizing the process of querying encrypted data.

Figure 3:
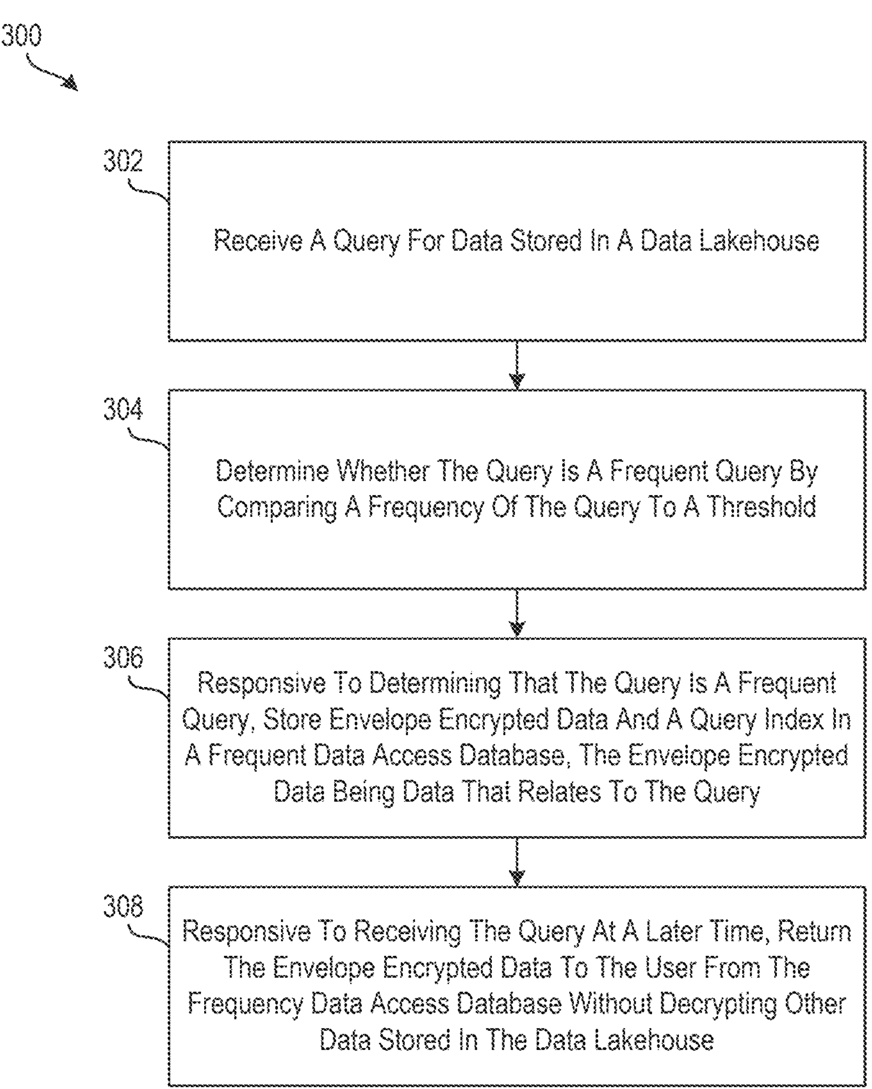
FIG. 3 illustrates a flow diagram of a method for providing data lakehouse encryption according to an embodiment of the present disclosure.

Turning now to FIG. 3, a flow diagram of a method 300 for providing data lakehouse encryption is provided according to an embodiment of the present disclosure. The method 300 can be performed by any suitable computing system, device, or environment such as those described herein. The method 300 is now described with reference to the computing environment 100, and particularly the encryption engine 150, but is not so limited. For example, the method 300 may be performed by the encryption engine 150.

The method 300 begins at block 302, where a query for data stored in a data lakehouse (e.g., data lakehouse 206) is received from a user (e.g., one of the users 220). This initial step involves capturing the query request from a user or system component that seeks to access specific data within the data lakehouse.

At block 304, the encryption engine 150 determines whether the query is a frequent query by comparing the frequency of the query to a predefined threshold. This involves analyzing the query's occurrence rate (e.g., how often the query occurs) and checking if the occurrence rate for the query meets or exceeds a set threshold that defines what constitutes a frequent query. The threshold can be based on a predefined number of repetitions of the query within a specific time period.

If it is determined that the query is a frequent query, the method 300 proceeds to block 306. At block 306, the encryption engine 150 causes envelope encrypted data and a query index to be stored in a frequent data access database (e.g., the frequent data access database 210). The envelope encrypted data is the data that relates to the query, and it is stored along with the query index to facilitate quick retrieval in future queries. This storage mechanism ensures that frequently accessed data is readily available without the need to decrypt the entire database (e.g., the data stored in clean data in storage 208).

At block 308, when the query is received again at a later time (e.g., from one of the users 220), the encryption engine 150 causes the envelope encrypted data to be returned to the user from the frequent data access database (e.g., the frequent data access database 210) without decrypting other data stored in the data lakehouse 206 and/or clean data in storage 208. This step significantly improves query performance by allowing the system 200 to quickly provide the requested data from the frequent data access database, thereby avoiding the computational overhead associated with decrypting the entire dataset.

Overall, the method 300 optimizes the process of querying encrypted data in a data lakehouse environment (e.g., the system 200) by identifying frequent queries, storing relevant encrypted data for quick access, and reducing the need for extensive decryption operations. This approach enhances the efficiency, performance, and security of data lakehouse systems.

Additional processes also may be included, and it should be understood that the processes depicted in FIG. 3 represent illustrations, and that other processes may be added or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processor set 110 and/or the processing circuitry 120) of a computing system (e.g., the computer 101), cause the processor to perform the processes described herein.

Figure 4:
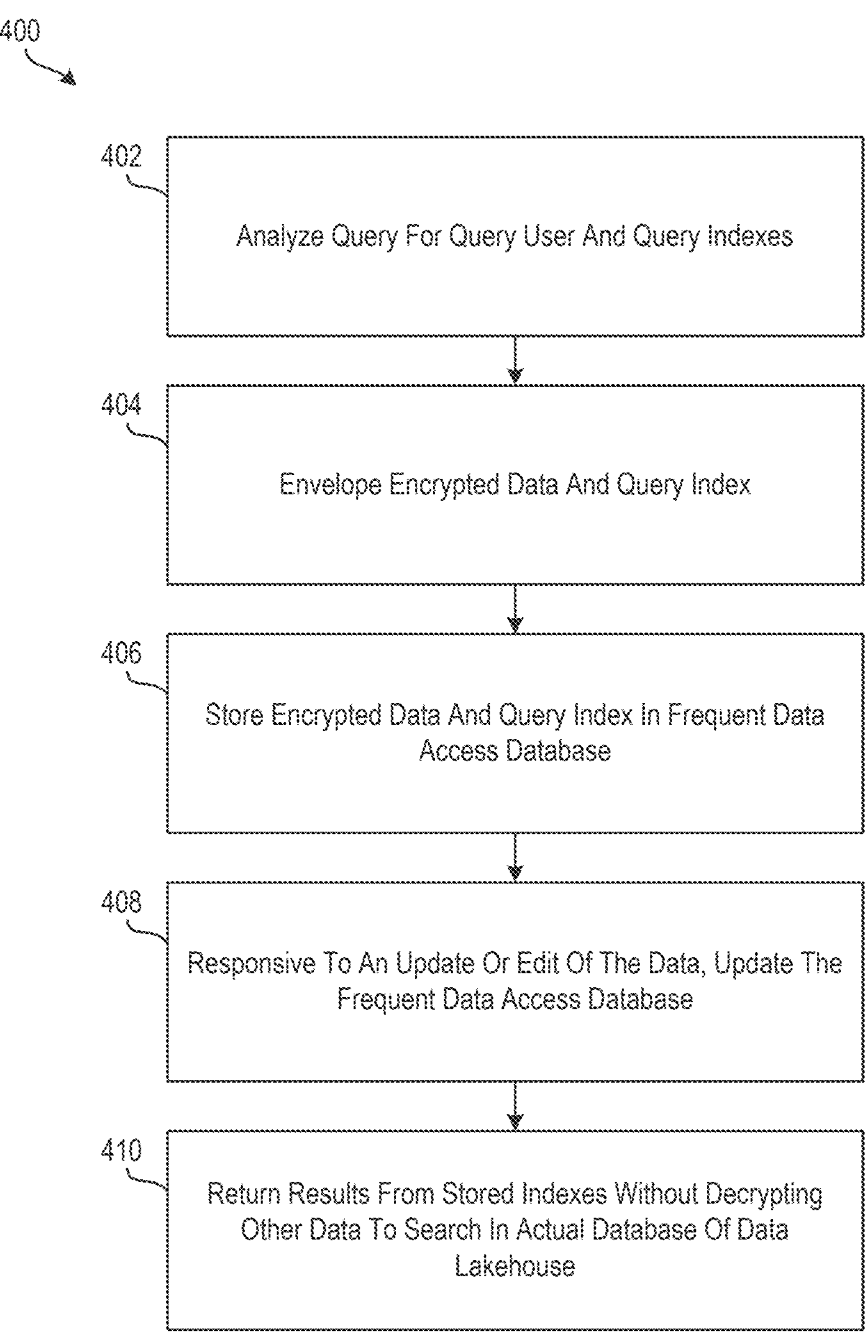
FIG. 4 illustrates a flow diagram of a method for providing data lakehouse encryption according to an embodiment of the present disclosure.

Turning now to FIG. 4, a flow diagram of a method 400 for providing data lakehouse encryption is provided according to an embodiment of the present disclosure. The method 400 can be performed by any suitable computing system, device, or environment such as those described herein. The method 400 is now described with reference to the computing environment 100, and particularly the encryption engine 150, but is not so limited. For example, the method 400 may be performed by the encryption engine 150.

The method 400 begins at block 402, where the system analyzes a query for the query user and query indexes. This step involves examining the incoming query to identify the user who made the query and the specific indexes associated with the query.

At block 404, the system 200 performs envelope encryption on the data and the query index. According to one or more embodiments, envelope encryption involves encrypting the data with a data encryption key and then encrypting the data encryption key with a key encryption key, ensuring that the data remains secure. For example, if the system 200 identifies same kind of frequent queries from one or more users, the system 200 stores envelope encrypted data and query index. A threshold for how many repetitions indicate frequent queries is implemented for the system 200 to make such an encrypted copy. The threshold can vary in different embodiments, such as based on computational load, storage requirements, access demands, user preferences, and/or the like, including combinations and/or multiples thereof.

Next, at block 406, the system 200 stores the encrypted data and query index in a frequent data access database (e.g., the frequent data access database 210). This database is designed to hold frequently accessed data and their corresponding query indexes, allowing for quick retrieval in future queries. For example, once the system 200 has performed initial learning phase to identify frequent queries, for queries that meet the threshold criteria (e.g., queries that are frequent queries), the system 200 stores encrypted data and query index in the frequent data access database 210. The data is customer key encrypted using the crypto keys for users 212. In some cases, a separate database (e.g., the frequency data access database) is not implemented; rather, original document or data can be modified to add additional index related fields, such as in clean data in storage 208.

At block 408, the system 200 updates the frequent data access database 210 in response to any updates or edits to the data. This step ensures that the stored encrypted data and query indexes remain current and accurate, reflecting any changes made to the underlying data. For example, if there is any update or edit happens on collection, the frequent data access database 210 values are also updated with envelope encryption. This update happens for the values that affect the corresponding query of the system stored values. The system 200 can use a dry run to validate if the update will affect data stored in the frequent data access database 210.

At block 410, the system 200 returns results from the stored indexes of the frequent data access database 210 without decrypting other data to search in the actual database of the data lakehouse 206. This step significantly improves query performance by allowing the system 200 to quickly provide the requested data from the frequent data access database, thereby avoiding the computational overhead associated with decrypting the entire dataset. For example, for consecutive similar queries, the system 200 returns the result from stored indexes without needing to decrypt to search in actual database (the clean data in storage 208). If the user and encrypted query index match, based on query index, the system 200 searches in the frequent data access database 210 instead, which has a specific scope and documents with respect to the known index. This enables the system 200 to match with encrypted query and encrypted index values directly. The system 200 can use order revealing index encryption according to one or more embodiments. In following example, an index is "createdAt" and index value is "2022-01-01T20:15:31Z." For example in a NoSQL database, for a user 1, the query is "find ({"createdAt": {$gte: ISODate("2022-01-01T20:15:31Z")}})." The system 200 can store the result as "{user1_index:{encrypted_index_data}, data: {encrypted_data}}."

Overall, the method 400 optimizes the process of querying encrypted data in a data lakehouse environment (e.g., the system 200) by analyzing queries, performing envelope encryption, storing frequently accessed data, updating the database as appropriate, and efficiently returning query results. This approach enhances the efficiency, performance, and security of data lakehouse systems.

Additional processes also may be included, and it should be understood that the processes depicted in FIG. 4 represent illustrations, and that other processes may be added or existing processes may be removed, modified, or rearranged without departing from the scope of the present disclosure. It should also be understood that the processes depicted in FIG. 4 may be implemented as programmatic instructions stored on a non-transitory computer-readable storage medium that, when executed by a processor (e.g., the processor set 110 and/or the processing circuitry 120) of a computing system (e.g., the computer 101), cause the processor to perform the processes described herein.

Figure 5:
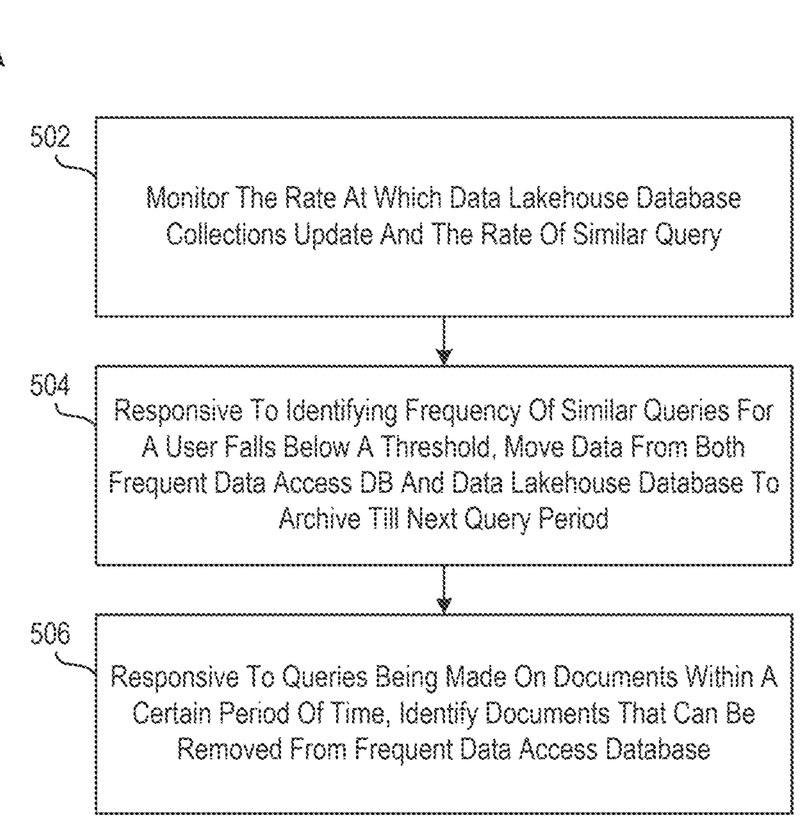
FIG. 5 illustrates a flow diagram of a method for providing data lakehouse encryption according to an embodiment of the present disclosure.

Turning now to FIG. 5, a flow diagram of a method 500 for providing data lakehouse encryption is provided according to an embodiment of the present disclosure. The method 500 can be performed by any suitable computing system, device, or environment such as those described herein. The method 500 is now described with reference to the computing environment 100, and particularly the encryption engine 150, but is not so limited. For example, the method 500 may be performed by the encryption engine 150.

The method 500 begins at block 502, where the system 200 monitors the rate at which data lakehouse database collections are updated and the rate of similar queries. This step involves continuously tracking changes in the frequent data access database 210 and the frequency of recurring queries to identify patterns and trends.

At block 504, the system 200 responds to identifying a drop in the frequency of similar queries for a user below a predefined threshold (e.g., once in a month, once in a year, etc.) by moving data from both the frequent data access database 210 and the data lakehouse 206 to an archive (not shown), such as until the next query for this data. This step ensures that infrequently accessed data is moved to an archive, thereby optimizing storage space and reducing the load on the primary database.

At block 506, the system 200 responds to queries being made on documents within a certain period by identifying documents that can be removed from the frequent data access database 210. This step involves analyzing the query patterns and determining which data are no longer frequently accessed, allowing the system 200 to remove such data from the frequent data access database 210 and further optimize storage space.

Overall, the method 500 enhances the efficiency and performance of data lakehouse environments (e.g., the system 200) by intelligently managing data storage based on query frequency and data update rates. This approach ensures that frequently accessed data is readily available while optimizing storage space by archiving infrequently accessed data and removing outdated documents from the frequent data access database.

Additional processes also may be included, and it should be understood that the processes depicted in FIG. 5 represent illustrations, and that other processes may be added or existing processes may be removed, modified, or rearranged without departing from the scope of the present disclosure. It should also be understood that the processes depicted in FIG. 5 may be implemented as programmatic instructions stored on a non-transitory computer-readable storage medium that, when executed by a processor (e.g., the processor set 110 and/or the processing circuitry 120) of a computing system (e.g., the computer 101), cause the processor to perform the processes described herein.

One or more embodiments described herein improves the functioning of a computer by optimizing the process of querying encrypted data in a data lakehouse environment.

One or more embodiments provides reducing cryptographic overhead. For example, by identifying frequently used queries and storing the results in a frequent data access database, one or more embodiments reduces the need to decrypt entire tables or collections for each query. This significantly lowers the computational resources required for cryptographic operations, thereby improving the overall efficiency of the system.

One or more embodiments provides enhancing query performance. For example, one or more embodiments provides for storing encrypted data and query indexes for frequent queries, allowing a system to return results from stored indexes without decrypting the entire database. This reduces the time taken to execute queries, leading to faster response times and improved performance for end-users.

One or more embodiments provides intelligent data management. For example, one or more embodiments continuously monitors the rate of updates in the original database collections and the frequency of similar queries. By doing so, such embodiments can optimize storage space by discarding data from the frequent data access database when query frequency drops below a predefined threshold. This intelligent data management ensures that storage resources are used efficiently.

One or more embodiments provides adaptive learning and storage optimization. For example, one or more embodiments employs heuristic learning and artificial intelligence capabilities to analyze query patterns and data changes. This adaptive learning allows the system to move infrequently accessed data to an archive, further optimizing storage space and protecting data from random access.

One or more embodiments provides order-revealing encryption. For example, the use of order-revealing index encryption enables one or more embodiments to match encrypted queries and encrypted index values directly. This allows for efficient searching within the frequent data access database without compromising security, thereby improving the overall functionality of the computer system.

By implementing these mechanisms, one or more embodiments described herein enhance the efficiency, performance, and security of data lakehouse environments, leading to a more effective and optimized computing system.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method for data lakehouse encryption, the method comprising:

receiving a query for data stored in a data lakehouse;

determining whether the query is a frequent query by comparing a frequency of the query to a threshold;

responsive to determining that the query is a frequent query, storing envelope encrypted data and a query index in a frequent data access database, the envelope encrypted data being data that relates to the query;

responsive to receiving the query at a later time, returning, to a user, the envelope encrypted data from the frequent data access database without decrypting other data stored in the data lakehouse;

monitoring a rate at which the envelope encrypted data in the frequent data access database are queried, and, responsive to the rate being below a threshold rate, removing the envelope encrypted data from the frequent data access database; and responsive to the rate being below the threshold rate, moving the envelope encrypted data from the frequent data access database and the data from the data lakehouse to an archive.

2. The computer-implemented method of claim 1, wherein it is determined that the query is a frequent query responsive to the frequency of the query satisfying the threshold.

3. The computer-implemented method of claim 2, wherein the threshold is based on a predefined number of repetitions of the query within a time period.

4. The computer-implemented method of claim 1, wherein the envelope encrypted data is encrypted by performing envelope encryption, which comprises encrypting the data with a data encryption key and then encrypting the data encryption key with a key encryption key to encrypt the data.

5. The computer-implemented method of claim 1, wherein the threshold is dynamically adjusted.

6. The computer-implemented method of claim 1, further comprising updating the frequent data access database in response to any updates or edits to the envelope encrypted data.

7. A computer system comprising:

a processor set;

one or more computer-readable storage media; and program instructions stored on the one or more computer-readable storage media to cause the processor set to perform operations comprising:

receiving a query for data stored in a data lakehouse;

determining whether the query is a frequent query by comparing a frequency of the query to a threshold;

responsive to determining that the query is a frequent query, storing envelope encrypted data and a query index in a frequent data access database, the envelope encrypted data being data that relates to the query;

responsive to receiving the query at a later time, returning, to a user, the envelope encrypted data from the frequent data access database without decrypting other data stored in the data lakehouse;

monitoring a rate at which the envelope encrypted data in the frequent data access database are queried, and, responsive to the rate being below a threshold rate, removing the envelope encrypted data from the frequent data access database; and responsive to the rate being below the threshold rate, moving the envelope encrypted data from the frequent data access database and the data from the data lakehouse to an archive.

8. The computer system of claim 7, wherein it is determined that the query is a frequent query responsive to the frequency of the query satisfying the threshold.

9. The computer system of claim 8, wherein the threshold is based on a predefined number of repetitions of the query within a time period.

10. The computer system of claim 7, wherein the envelope encrypted data is encrypted by performing envelope encryption, which comprises encrypting the data with a data encryption key and then encrypting the data encryption key with a key encryption key to encrypt the data.

11. The computer system of claim 7, wherein the threshold is dynamically adjusted.

12. The computer system of claim 7, wherein the operations further comprise updating the frequent data access database in response to any updates or edits to the envelope encrypted data.

13. A computer program product comprising:

one or more computer-readable storage media; and program instructions stored on the one or more computer-readable storage media to perform operations comprising:

receiving a query for data stored in a data lakehouse;

determining whether the query is a frequent query by comparing a frequency of the query to a threshold;

responsive to determining that the query is a frequent query, storing envelope encrypted data and a query index in a frequent data access database, the envelope encrypted data being data that relates to the query;

responsive to receiving the query at a later time, returning, to a user, the envelope encrypted data from the frequent data access database without decrypting other data stored in the data lakehouse;

monitoring a rate at which the envelope encrypted data in the frequent data access database are queried, and, responsive to the rate being below a threshold rate, removing the envelope encrypted data from the frequent data access database; and responsive to the rate being below the threshold rate, moving the envelope encrypted data from the frequent data access database and the data from the data lakehouse to an archive.

14. The computer program product of claim 13, wherein it is determined that the query is a frequent query responsive to the frequency of the query satisfying the threshold.

15. The computer program product of claim 14, wherein the threshold is based on a predefined number of repetitions of the query within a time period.

16. The computer program product of claim 13, wherein the envelope encrypted data is encrypted by performing envelope encryption, which comprises encrypting the data with a data encryption key and then encrypting the data encryption key with a key encryption key to encrypt the data.

* * * * *